United States Patent [19]

MacIsaac et al.

[11] Patent Number: 5,112,365
[45] Date of Patent: May 12, 1992

[54] FUEL BLOCK

[75] Inventors: John E. MacIsaac, Alliance; Mark K. MacIsaac, Louisville, both of Ohio

[73] Assignee: Sebring Forest Industries, Inc., Sebring, Ohio

[21] Appl. No.: 645,692

[22] Filed: Jan. 25, 1991

[51] Int. Cl.⁵ ............................ C10L 5/14; C10L 5/00
[52] U.S. Cl. ......................................... 44/576; 44/541; 44/590; 44/606
[58] Field of Search .................... 44/576, 590, 606, 541

[56] References Cited

U.S. PATENT DOCUMENTS

| | | | |
|---|---|---|---|
| 2,789,890 | 4/1957 | Stevens | 44/576 |
| 3,726,651 | 4/1973 | Ronden | 44/14 |
| 3,877,886 | 4/1975 | Dalzell | 44/40 |
| 4,040,796 | 8/1977 | Vincent | 44/576 |
| 4,043,765 | 8/1977 | Tanner | 44/14 |
| 4,104,034 | 8/1978 | Wu et al. | 44/10 |
| 4,120,666 | 10/1978 | Lange | 44/10 |
| 4,147,518 | 4/1979 | DeHart et al. | 44/13 |
| 4,243,394 | 1/1981 | Kincaid | 44/576 |

FOREIGN PATENT DOCUMENTS 0067791  4/1983  Japan ...................... 44/590

*Primary Examiner*—Brian E. Hearn
*Assistant Examiner*—Maria Nuzzolillo
*Attorney, Agent, or Firm*—Michael Sand Co.

[57] ABSTRACT

An improved fuel block of compressed combustible particles and a binder has a controlled burn rate preferably for use adjacent citrus fruit trees to prevent frost damage. The fuel block preferably has a cylindrical body and is formed with a longitudinally extending series of individual spaced depressions in the side surface of the body. The side surface of the fuel body is tightly wrapped with a combustible paper which forms air pockets with the side surface of the spaced depressions. These air pockets in combination with the paper, provide a series of alternating fast and slow burn layers which enable the body to burn in progressive layers instead of burning the entire body at the same time. An outer protective plastic wrapper protects the fuel body and wrapper paper from the weather until ready for use. A central hole is formed through the fuel body to assist in the initial lighting of the top surface of the body.

19 Claims, 2 Drawing Sheets

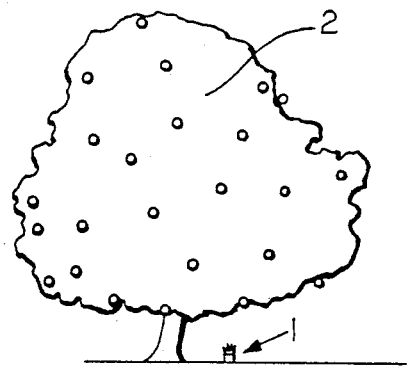
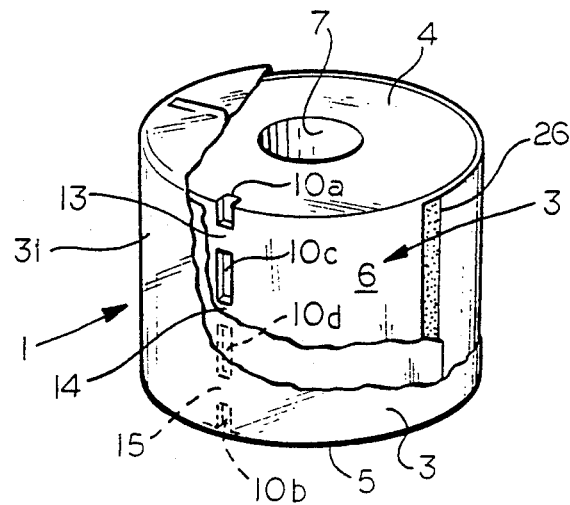
FIG. 1                FIG. 2
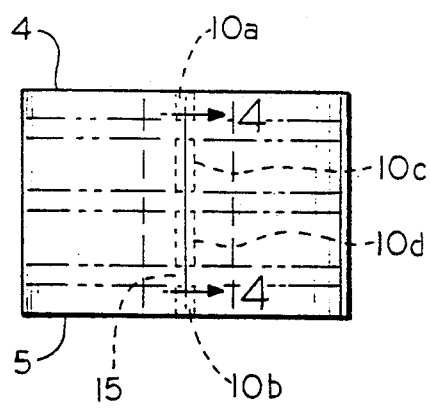
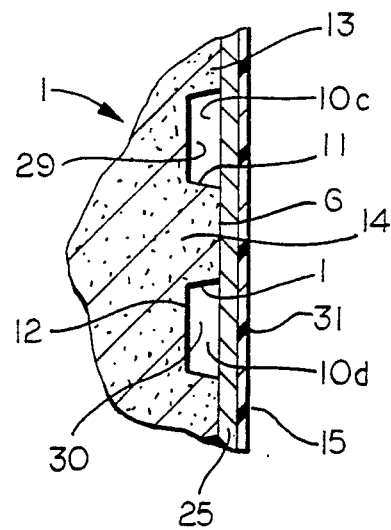
FIG. 3                FIG. 4

FUEL BLOCK

BACKGROUND OF THE INVENTION

1. Technical Field

The invention relates to artificial fuels and in particular to a fuel block formed of compressed combustible particles and a binder. More particularly, the invention relates to such a fuel block having a controlled burning rate so that the fuel block will burn over extended periods of time. More particularly, the invention relates to such a fuel block used in preventing frost damage to citrus fruit trees.

2. Background Information

Various types of heaters and fuels are used to prevent damage to fruit trees and the fruit thereon due to frost. These prior fuel devices are usually mechanical type stoves containing various types of liquid fuels such as oil, kerosene or the like. The stoves are placed beneath the fruit trees or adjacent to a number of trees, and are lighted in an attempt to produce sufficient heat to prevent frost from damaging the trees and fruit. Although certain of these heater devices are satisfactory, they provide certain undesirable characteristics such as environmentally unsatisfactory fumes and particulate discharge, as well as the expense involved for the heating fluid used therein. Also, it requires the transportation and storage of the numerous heaters and fuel during the majority of the growing season since such heaters are used only occasionally, but are absolutely essential at such times to prevent destruction of the trees and fruit.

Upon an expected frost, the fruit growers must transport all of the heaters from storage and place the same along the trees and then fill the heaters with the heating fluid which is usually kept in a mobile storage tanker. All of this equipment and labor intensive activity, increases the production costs to the fruit grower.

Artificial fuel logs usually comprised of compressed sawdust and various wax binders and other combustible fillers and igniters, have been developed over the years primarily for use in a home fireplace. Examples of such artificial fireplace logs are shown in U.S. Pat. Nos. 2,789,890, 4,104,034, 4,120,666, 4,147,518, 4,243,394, 4,043,765, 4,040,796, 3,726,651 and D 311,578. Some of these artificial firelogs are formed with center holes and outer grooves extending throughout the length of the logs, to enhance the burning thereof. These logs also are provided with various wrappers for protecting the log from the environment as well as providing a readily available combustible material to assist in igniting the log.

Although these artificial fireplace logs are satisfactory for their intended use, they have a relatively short burning time since the main desire of such logs is to simulate a regular burning wood log. Thus, the log will burn throughout its entire length and circumference at about the same time. Therefore, once these artificial logs are ignited, the entire log will generally burn throughout its length which results in a relatively short burning time, three hours being the normal burn length of most artificial firelogs in use today. Although these firelogs could be used for the protection of fruit trees, their short burning lengths would require several logs to be burned successively to adequately protect the trees which would result in considerable expenditure of man hours of labor, equipment and logs.

Therefore, the need exists for an improved fuel block preferably formed of a compressed combustible material which has a sufficient burning time and heat emission to prevent frost damage to fruit trees and fruit, without requiring excessive amounts of combustible material and weight to achieve such burn time and heat emission, and in which less man hours are required for use of the fuel blocks than heretofore required with the standard mechanical heaters and separate liquid fuel; and in which the fuel blocks can be placed in position for usage prior to the anticipated frost to ensure that the same are readily available should a sudden frost occur.

SUMMARY OF THE INVENTION

Objectives of the invention include providing an improved fuel block having a controlled burning rate which provides a sufficiently long burning time, preferably about eight hours, while providing a sufficient amount of heat during such burn time, to protect fruit trees and their fruit from frost damage without requiring excessive combustible material for the formation of such a fuel block.

A still further objective of the invention is to provide such a fuel block which will burn clean and meet environmental approval and which will replace the heretofore used mechanical heating devices which burned oil, kerosene or similar fuels.

Still a further objective of the invention is to provide such a fuel block which can be placed in position beneath the fruit trees well before the time that a damaging frost can occur, thereby requiring the orchard operators to only light the blocks at the time of a frost, thereby avoiding the expensive and time consuming procedure of removing the mechanical heating devices from storage and placing the same about the trees and then subsequently filling the devices with the appropriate liquid fuel.

Still another objective of the invention is to provide such a fuel block which can be mass produced by known extrusion processes and safely wrapped with conventional packaging equipment of the general type heretofore used for the manufacture of artificial firelogs thereby avoiding additional expensive equipment.

A further objective of the invention is to provide such a fuel block which once lit will burn in a series of stacked layers from the top of the block towards the bottom thereof over an extended period of time without the entire block being consumed throughout its entire length after lighting of the block as heretofore occurs with usual artificial fireplace logs.

A still further objective is to provide such an improved fuel block which can be mass produced relatively inexpensively and which can be shipped and stored at a minimum of cost and ignited easily at the time when needed to protect the fruit trees and their fruit.

These objectives and advantages are obtained by the improved fuel block of the invention, the general nature of which may be stated as including, an elongated solid body having top, bottom and outer surfaces and a longitudinal axis, said body being formed of compacted particles of a combustible material and a binder; a series of individual depressions formed in the outer surface of the body and spaced longitudinally along said outer surface; a combustible wrapper covering at least the outer surface of the body in a close fitting relationship; and an outer weatherproof protective wrapper completely enclosing the body and the combustible wrapper, wherein the combustible wrapper in combination with the individual depressions control the burning of the body from the top surface towards the bottom surface in a series of combustion layers defined by the spaced depressions upon igniting the top surface of said body.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 1 is a diagrammatic view showing the improved fuel block located beneath a fruit tree;

FIG. 2 is a perspective view of the improved fuel block with part of the outer weatherproof wrapping and part of the inner burn control wrapper being removed;

FIG. 3 is a side elevational view of the improved fuel block;

FIG. 4 is a greatly enlarged fragmentary sectional view of the combustible body, burn control wrapper and outer protective weatherproof wrapper, taken on line 4—4, FIG. 3;

Similar numerals refer to similar parts throughout the drawings.

DESCRIPTION OF THE PREFERRED EMBODIMENT

Figure 5:
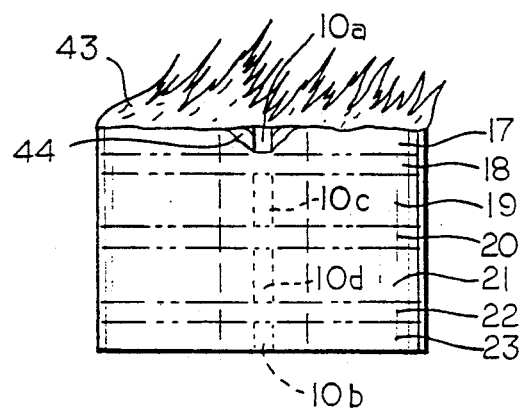
FIGS. 5 and 6 are diagrammatic views showing the fuel block being burned in successive layers during use.

FIG. 1 illustrates a preferred application of the improved fuel block which is indicated generally at 1, and which is shown burning beneath a fruit tree 2. The improved fuel block is shown particularly in FIG. 2, and preferably has a cylindrical configured body 3 with spaced parallel top and bottom generally circular surfaces 4 and 5, and a cylindrical side surface 6. Preferably a central hole or bore 7 is formed in and extends throughout the longitudinal length of body 3. Body 3 will weigh within the range of between 9 pounds and 12 pounds and will have a height within the range of between 5 inches and 8 inches, and a diameter of approximately 8 inches. In the preferred embodiment, body 3 will weigh between 9 ½ pounds and 10 ½ pounds and will be between 5 inches and 6 inches high.

Body 3 may be formed of various formulations but will consist primarily of compressed combustible particles such as sawdust, agricultural byproducts such as corn cobs, corn stalks, sugar cane waste referred to as bagasse, etc., which is combined with a binder. In a preferred embodiment, the combustible material is sawdust which may be approximately 50% by weight of body 3 and the remainder being a wax binder. If desired, various slack waxes and other materials such as fatty acids, can also be incorporated therein in order to enhance the cleanliness of the burn characteristics of body 3.

In accordance with one of the main features of the invention, a series of individual depressions 10 are formed in a longitudinal, preferably aligned relationship, in outer surface 6 of body 3, as shown particularly in FIGS. 2 and 3. The topmost depression 10a and the bottommost depression 10b, preferably communicate directly with top surface 4 and bottom surface 5 respectively, and are approximately one half the longitudinally length of intervening depressions 10c and 10d. The purpose of these depressions is described more fully below. Depressions 10 preferably have a generally truncated configuration formed by sloped side surfaces 11 and a generally flat bottom surface 12 (FIG. 4). This configuration provides for the easy formation of the depressions during manufacture as discussed below.

In the preferred embodiment shown in the drawings, four depressions 10 are formed in a longitudinal or axial alignment in body 3. However, for certain applications three or five depressions 10 can be utilized. For example, in a 5 ¼ inch high log, depressions 10c and 10d will have a height of approximately 1-¼ inches and a width of approximately ½ inch, with top and bottom depressions having a height of approximately ⅝ inches and a width of approximately ¼ inch. Depressions 10 will provide three intervening areas indicated at 13, 14 and 15 along body 3 which have a height of approximately ¼ inches, or a height approximately ½ the height of depressions 10c and 10d. These depressions and areas form alternating fast and slow burn layers, which are shown in FIG. 5 and are indicated at 17 through 23. These dimensions and rates will vary slightly depending upon the diameter and height of the fuel body and the particular formulation used for forming body 3.

In further accordance with the invention, a combustible burn control wrapper 25 is wrapped tightly about outer side surface 6 of body 3, extending generally completely between top and bottom surfaces 4 and 5 and is secured thereon by an adhesive strip 26 (FIG. 2). Wrapper 25 preferably is a 40 pound kraft paper. Each of the depressions form an air pocket with the kraft paper, two of which are shown in FIG. 4 and are indicated at 29 and 30. Next, an outer weatherproof wrapper 31 covers the entire fuel body including burn control wrapper 25 and top and bottom surfaces 4 and 5 to provide a complete weatherproof covering for the fuel body. Preferably, wrapper 31 is a UV barrier polyethelyne or PET plastic which can be heat sealed or heat shrunk about body 3 in a relatively simple and inexpensive manner to completely protect body 3 and burn wrapper 25 from the weather. Wrapper 31 enables the fuel block to be placed beneath a fruit tree prior to its anticipated use, and enables the fuel block to remain in such a ready position throughout the growing season without any damage or deterioration of the inner contents. This enables the fuel blocks to be placed beneath the trees at a time convenient with the grower, where they will remain until needed. Should the blocks not be needed during the potential frost season, they can remain under the trees until the next potential frost season without harm due to outer protective wrapper 31.

Figure 7:
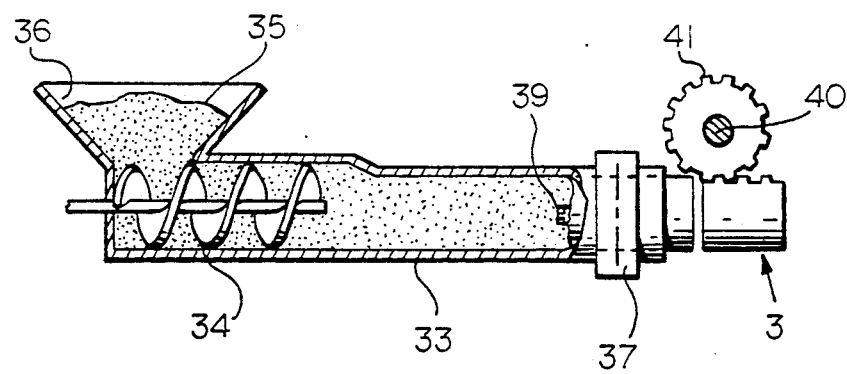
FIG. 7 is a generally diagrammatic sectional view showing one manner in which the improved fuel block is produced.

FIG. 7 depicts diagrammatically a type of mechanism for formation of fuel body 3. A cylindrical extruder barrel 33 contains an auger 34 and receives the combustible sawdust and associated binder mixture 35 through an inlet opening 36 where it is compressed as it moves along the barrel before being extruded through a die 37. The extruded material then is cut into the desired length by various cutter mechanisms (not shown), and then subsequently moved through a wrapping machine for placement of burn control wrapper 25 thereon, and subsequently outer protective plastic wrapper 31, all in a continuous manufacturing operation. A cylindrical die rod 39 is mounted within barrel 33 adjacent die 37 to form central hole 7 in body 3 as it is being extruded through die 37.

In order to form depressions 10 at the desired locations along each body 3, one procedure would be to install a rotatable cogwheel 40 having a plurality of truncated teeth 41 about the circumference thereof. Cogwheel 40 is located adjacent the outlet of die 37 for penetration into body 3 to form the series of depressions. The truncated configuration of teeth 41 enables wheel 40 to revolve smoothly over the extruded body and the teeth to enter and exit the compressed material in a generally rotary manner without deforming body 3.

It is readily seen that other types of manufacturing procedures can be utilized for forming fuel body 3 and in particular depressions 10 therein, other than that shown in FIG. 7, without affecting the concept of the invention.

Figure 6:
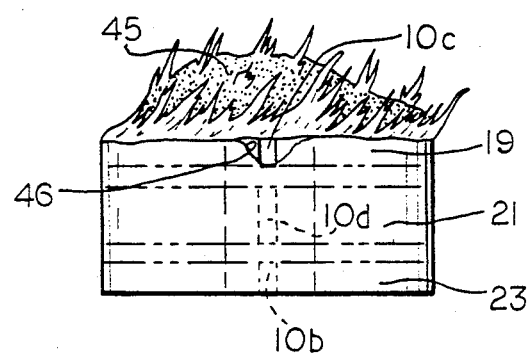

FIGS. 5 and 6 show the controlled burning rate and manner of use of fuel block 1 which achieves the advantages of the present invention. When the fuel block is needed, a grower by use of a match or lighting torch, will light the top surface of the completely wrapped block adjacent center hole 7. The flame will immediately melt the plastic outer wrapping 31 away from opening 7 and away from top surface 4 of body 3. Applying the flame to top surface 4 adjacent center hole 7 enables top surface 4 to easily ignite than if the top surface was without hole 7 or a similar depression therein. The flame indicated at 43 in FIG. 5, will then spread across top surface 4 and upon encountering top notch 10a will burn axially downwardly along wrapper 25 in a generally V-shaped relationship as shown at 44 in FIG. 5. Depression 10a and the air pocket formed thereby, will enable the compressed combustible material of layer 17 to burn generally axially downwardly in a controlled steady manner together with the surrounding portion of burn control wrapper 25 and outer wrapper 31 until reaching the bottom of depression 10a. Wrapper 25 prevents the flames from spreading completely along the length of the fuel body due to its generally airtight wrapped relationship with outer surface 6. Thus, wrapper 25 will burn downwardly along with the intervening particulate combustible material of layer 17 until reaching the bottom of depression 10a.

The flames then continue to burn downwardly in an even fashion throughout the next burn layer 18, again without spreading throughout the length of body 3, due to the airtight wrapping of wrapper 25. The flames will burn more slowly along layer 18 than along layer 17 due to the absence of any depression 10 in layer 18. As shown in FIG. 6, ash 45 will collect on top of body 3 and will be hot and provide radiant heat for protecting the adjacent tree and fruit. Layer 18 is approximately ½ inches thick in the preferred embodiment, and wrapper 25 will enable the ash thereof to remain collected together. If layer 18 was too deep the collected ash could smother the flames. However, before this can occur, the flames reach next depression 10c burning wrapper 25 away in another V-shaped arrangement 46 as shown in FIG. 6, enabling layer 19 to burn more quickly than previous layer 18. Thus, body 3 will burn throughout successive layers 17 through 23 in a controlled burning rate, first a faster layer and then a slower layer.

It has been found that fuel body 3 of the size referred to above, will take approximately seven to eight hours to completely burn. Were it not for combustible wrapper 25 being tightly bound about the outer cylindrical surface 6 of body 3, the flames would spread rapidly along the outer surface of the body and shortly engulf the entire body in flames resulting in a considerable quicker burning rate than desired. It also has been determined that the particular size fuel body set forth above provides sufficient heat output during the burning of the exposed combustion layer. Should a greater heat output be desired, a larger diameter body could be provided since the diameter of the body as well as the particular combustible material used therefore, determines the heat output, with the height of the fuel body generally determining the length of burn time.

Preferably top depression 10a communicates with top surface 4 to ensure that flame 43 will burn downwardly along combustible wrapper 25 to enable top burn layer 17 to be ignited easily to start the burning process of body 3. Furthermore, bottom depression 10b communicates with bottom surface 5 to ensure that the entire amount of combustible material is burned which may not occur if the depression and corresponding air pocket stopped prior to bottom surface 5.

Thus, the improved fuel block provides a source of fuel which is readily manufactured in known extrusion processes at a relatively low cost, and which can be completely wrapped with burn control wrapper 25 and then placed in outer protective wrapper 31 in a continuous manufacturing operation wherein wrapper 31 completely protects the fuel block from the ambient weather enabling it to be placed outside until ready for use. Protective wrapper 31 does not have to be removed upon lighting the top surface of body 3 but will burn or melt easily along with adjacent wrapper 25. Furthermore, center hole 7 facilitates the initial lighting of top surface 4, and depressions 10 in combination with tightly wrapped wrapper 25, provide for the controlled burn of body 3 in a series of axially extending alternating fast and slow burn layers throughout the axial length of the body. The absence of depressions 10 enable the body to burn slowly along layers 18, 20 and 22 to provide slow heat output, and then the presence of depressions 10 enable body 3 to burn faster along fast burn layers 17, 19, 21 and 23, to prevent the flames from extinguishing themselves in the slow burn layers due to excessive accumulation of ash within tightly wrapped kraft paper 25.

Accordingly, the improved fuel block is simplified, provides an effective, safe, inexpensive, and efficient fuel source which achieves all the enumerated objectives, provides for eliminating difficulties encountered with prior fuel sources, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved fuel block is constructed and used, the characteristics of the construction, and the advantageous, new and useful results obtained; the new and useful structures, devices, elements, arrangements, parts and combinations, are set forth in the appended claims.

What is claimed is:

1. A controlled burning fuel block including:
   a) an elongated body having top, bottom and outer surfaces formed of compacted particles of a combustible material and a binder;
   b) a series of individual depressions formed in the outer surface of the body and spaced longitudinally along said outer surface;
   c) a combustible wrapper covering at least the outer surface of the body in a tightly wrapped relationship against said outer surface; and
   d) an outer weatherproof protective wrapper completely enclosing the body and the combustible wrapper, wherein the combustible wrapper in combination with the individual depressions control the burning of the body from the top surface towards the bottom surface in a series of combustion layers having different burn rates defined by the spaced depressions, upon igniting the top surface of said body.

2. The fuel block defined in claim 1 in which the combustible body is generally cylindrical with the top and bottom surfaces being circular and the outer surface being cylindrical.

3. The fuel block defined in claim 2 in which the diameter of the combustible body is approximately eight inches.

4. The fuel block defined in claim 3 in which the longitudinal length of the combustible body is within the range of between five and eight inches.

5. The fuel block defined in claim 1 in which the combustible material is an agricultural byproduct selected from the group of corn cobs, corn stalks, sugar cane waste, and a binder.

6. The fuel block defined in claim 1 in which the combustible material is sawdust and the binder is wax.

7. The fuel block defined in claim 1 in which the depressions have a generally truncated configuration with a depth of approximately ½ inch.

8. The fuel block defined in claim 1 in which the combustible wrapper is kraft paper.

9. The fuel block defined in claim 1 in which the combustible wrapper covers only the outer surface of the body with the top and bottom surfaces being covered only by the protective wrapper.

10. The fuel block defined in claim 1 in which a bore is formed within the center of the combustible body.

11. The fuel block defined in claim 1 in which one of the depressions in the outer surface of the body communicates with the top surface of said body, and another of the depressions communicates with the bottom surface of the body.

12. The fuel block defined in claim 1 in which the depressions form air pockets between the combustible wrapper and the combustible body to promote combustion of an adjacent layer of the body located between adjacent pairs of said depressions.

13. The fuel block defined in claim 1 in which the outer weatherproof protective wrapper is a heat shrinkable plastic.

14. The fuel block defined in claim 1 in which the combustible body weighs within the range of between nine and twelve pounds.

15. The fuel block defined in claim 1 in which alternating layers of the combustion layers have different burn rates.

16. The fuel block defined in claim 15 in which the burn layers having a depression formed therein burn at a faster rate than the adjacent burn layers without a depression.

17. An elongated fuel block formed of a combustible material having top and bottom surfaces and an intervening outer surface, said outer surface being formed with a series of longitudinally spaced depressions and a hole being formed through the block; a tightly wrapped layer of combustible material extending about the outer surface forming an air pocket with each of said depressions whereby said wrapper and depressions form a stacked series of alternating combustion layers having different burn rates to control the burn rate of said block after lighting the top surface thereof; and an outer plastic wrapper completely enclosing the fuel block and combustible wrapper.

18. An elongated cylindrical fuel block formed of a combustible material having top and bottom surfaces and an intervening outer surface, said outer surface being formed with a series of longitudinally spaced depressions arranged in spaced longitudinal alignment along the outer surface of the block and a hole being formed through the block; and a tightly wrapper layer of combustible material extending about the outer surface forming an air pocket with each of said depressions whereby said wrapper and depressions form a stacked series of alternating combustion layers having different burn rates to control the burn rate of said block after lighting the top surface thereof.

19. An elongated fuel block formed of a combustible material including a compacted sawdust and a wax binder and having top and bottom surfaces and an intervening outer surface, said outer surface being formed with a series of longitudinally spaced depressions and a hole being formed through the block; and a tightly wrapper layer of combustible material extending about the outer surface forming an air pocket with each of said depressions whereby said wrapper and depressions form a stacked series of alternating combustion layers having different burn rates to control the burn rate of said block after lighting the top surface thereof.

* * * * *